United States Patent Office 3,236,795
Patented Feb. 22, 1966

3,236,795
COATING COMPOSITIONS COMPRISING CARBOX-
YL INTERPOLYMERS AND EPOXIDIZED FATTY
ACID ESTERS
Richard B. Graver, Minneapolis, Minn., assignor to
Archer-Daniels-Midland Company, Minneapolis, Minn.,
a corporation of Delaware
No Drawing. Filed Mar. 2, 1961, Ser. No. 92,744
3 Claims. (Cl. 260—23)

This invention relates to new and improved thermosetting film forming resins of non-drying epoxidized long chain fatty acid material and a method of preparing the same. More particularly, this invention relates to new coating compositions of copolymers of styrene or vinyl toluene with an acrylic acid and alkyl esters of an acrylic acid crosslinked with epoxidized long chain fatty ester materials providing improved infusible and solvent insoluble films, the method of forming and applying the same, and resultant films therefrom.

The paint formulating art is constantly seeking to improve outdoor color retention and overbake color retention with continued film adhesion and flexibility. Many formulations of styrene, alkylated styrene, acrylic acid material and epichlorohydrin or a glycidyl compound have been made claiming various features of differences and improvements over each other. Essentially, the art is seeking new ways to utilize epoxidized fatty esters which are essentially of a non-drying and non-resinous character. Such fatty esters, having internal oxirane, have heretofore been primarily utilized as plasticizing agents for polyvinyl chloride resins. This is in direct contrast to the relatively hard resinous epichlorohydrin type and glycidyl compounds with their terminal oxirane groups. Other and various coating formulations of vinyl and similar compounds with epoxidized fatty esters are also known to the art. However, the coating art is still in need of being shown new ways in which to utilize epoxidized fatty esters and particularly is desirous of obtaining superior films having improved outdoor color and gloss retention and overbake color and gloss retention with preservations of film flexibility and film adhesion.

Accordingly, it is an object of this invention to provide new and improved coating compositions, method of formulating the same and resultant coatings therefrom.

Another object of this invention is to provide new coating compositions of copolymers of styrene or vinyl toluene, an acrylic acid and alkyl esters of acrylic acids in combination with epoxidized fatty oils and the improved coatings herein obtained by such compositions.

An additional object of this invention is to provide improved coating compositions, as defined herein, which are superior to the prior art compositions in protective film performance accompanied by a reduction in cost of the finished coating compared to the different coating compositions known to the art.

To the accomplishment of the foregoing and related ends, other objects are those inherent herein and as illustrated, described and claimed. This invention then comprises an improvement in providing new coating compositions including the features above and hereinafter set forth, and as more fully described and particularly pointed out by certain illustrative embodiments. These are indicative of the ways in which improved thermosetting and epoxidized coating vehicle composition can be made from non-drying epoxidized fatty oils and epoxidized long chain fatty esters in cross-linking relationship with the copolymers of the character, as herein described as claimed.

These new coating compositions are essentially comprised of four parts, as follows:

(1) A linear thermoplastic copolymer of from 15–80 parts styrene or vinyl toluene, from 15–80 parts of a lower alkyl ester of acrylic, methacrylic, crotonic acid or mixtures thereof, and from 5–25 parts of an acrylic acid or mixtures thereof the total parts being 100.

(2) In combination with 100 parts of the said linear thermoplastic copolymer from 10 to 60 parts of an epoxidized oil or fatty ester prepared by the epoxidation of an unsaturated vegetable oil with an iodine value greater than about 80, or of synthetic oils or esters prepared by the esterification of long chain fatty acids or mixtures of acids having an iodine value greater than about 80 with a suitable polyhydric alcohol. The epoxidation of unsaturated oils and fatty esters is well known to the art. The preferred epoxidized oils and fatty esters contain at least 6.0% epoxy oxygen by weight.

(3) In combination with (1) and (2) above a solvent system comprised of from 10 to 100 parts solution solvent and 0 to 90 parts diluent solvent may be utilized. More specifically the solvent system with the above comprises from about 50 to 90 parts xylene and about 10 to 50 parts mono-methyl ether of ethylene glycol or butyl alcohol in the preferred cases. Other solvents systems are possible as will be described hereinafter. In general, the total weight of solvent is about equal to the sum of the weight of copolymer and epoxidized oil, thus giving a composition containing about 50% film forming ingredients and about 50% solvent.

(4) In combination with the above compositions, a catalyst selected from the group of quaternary ammonium hydroxides, alkali metal hydroxides and alkali metal salts of weak organic acids is used at a level of 0.25–2% of the resin forming ingredients. The use of a catalyst is preferred, however, suitable coatings may be obtained without a catalyst.

The coating compositions of the above described type provide, upon curing at temperatures from 200° F. to 400° F., protective coating films having excellent properties of adhesion to bare metals such as iron, steel, galvanized iron, aluminum and tin plated steel, extremely good flexibility and chip resistance, high gloss, excellent color retention and mar resistance in addition to other desirable properties. In addition, the film properties of the coating compositions described in this invention are superior to those of the films obtained from prior art coating compositions of the same general type, such as those compositions disclosed in U.S. Patents 2,604,464, 2,662,870 and 2,798,861.

To illustrate in more detail the manner of practicing this invention for affording the improvements provided, the following examples are illustrative:

*Example I*

65 parts xylene and 16 parts butyl alcohol were charged to a flask equipped with an agitator, thermometer, reflux condenser and a graduated dropping funnel. 50 parts vinyl toluene, 10.2 parts methyl methacrylate, 6 parts 2-ethyl hexyl acrylate, 12.9 parts of methacrylic acid and 2.4 parts cumene hydroperoxide were added to the dropping funnel. The xylene and butanol were heated to 240° F. and the monomer mixture in the dropping funnel was added dropwise over a 3 hour period while the reaction mixture was maintained at 240° F. The reaction mixture was kept at about 240° F. for 3 hours after the monomers were in, at which time the percent non-volatile of the mixture was determined to be 50%, which indicated the copolymerization reaction was complete. 100 parts of this copolymer and 15 parts epoxidized soybean oil containing 6.3% internal epoxy oxygen by weight and sold commercially as Admex 710 were mixed with 12 parts xylol and 3 parts butanol. Films of this blend cast on glass and baked 30 minutes at 300–350° F. were tough, hard, flexible and had excellent soap, alkali, water and solvent resistance.

*Example II*

100 parts of the copolymer from Example I were blended with 10 parts epoxidized linseed oil having an epoxy oxygen content of 8.5% by weight and 8 parts xylol and 2 parts butanol. Films of this blend were prepared and baked 30 minutes at 300–350° F. These films were harder than those in Example I and in addition were more flexible than those of Example I. In addition, the soap, alkali, water and solvent resistance was excellent White enamels prepared from this system were more durable than white enamels prepared from the system of Example I.

*Example III*

A copolymer was prepared as described in Example I using 61 parts xylene, 16 parts butyl alcohol, 25 parts vinyl toluene, 31.4 parts methyl methacrylate, 6 parts 2-ethyl hexyl acrylate, 12.9 parts methacrylic acid and 2.4 parts cumene hydroperoxide. 100 parts of the copolymer solution at 50% solids was blended with 10 parts epoxidized linseed oil and 8 parts xylene and 2 parts butyl alcohol. Both pigmented gloss enamel films and clear films when baked at 300–350° F. yielded films which were highly resistant to solvents, soaps and alkali, had very good flexibility and adhesion on metals and very good color retention.

*Example IV*

100 parts of the copolymer solution prepared in Example III blended with 15 parts of epoxidized linseed oil, 12 parts xylene and 3 parts of monomethyl ether of ethylene glycol yielded films which were slightly softer and more flexible when baked at 300° F. to 350° F. than those in Example III. The resistance of the film to soap, alkali and solvents was the same as in Example III.

*Example V*

A copolymer was prepared as described in Example I using 56 parts xylol, 14 parts butyl alcohol, 49.5 parts styrene, 6.0 parts 2-ethyl hexyl acrylate, 12.9 parts methacrylic acid and 2.1 parts cumene hydroperoxide. 100 parts of the copolymer solution blended with 15 parts epoxidized linseed oil, 12 parts xylene and 3 parts monomethyl ether of ethylene glycol yielded films when baked at 300–400° F. which were highly resistant to xylol, acetone and other solvents, soaps an alkalis and which also had a good flexibility, high hardness and excellent adhesion.

*Example VI*

A copolymer was prepared as in Example I using 55.6 parts xylol, 13.9 parts monoethyl ether of ethylene glycol, 44.1 parts styrene, 13.3 parts ethyl acrylate, 10.8 parts acrylic acid and 2.0 parts cumene hydroperoxide. 100 parts of this copolymer solution blended with 15 parts epoxidized soybean oil, 12 parts xylol and 3 parts monomethyl ether of ethylene glycol yielded films on baking at 350° F. which had excellent flexibility, adhesion, solvent and soap resistance.

*Example VII*

The copolymer-epoxidized oil blend in Example VI when catalyzed with 1% benzyl trimethyl ammonium hydroxide based on solids yielded films when baked at 250° F. which were quite comparable to those obtained in Example VI which were baked at 350° F.

*Example VIII*

100 parts of the copolymer solution prepared in Example VI was blended with 10 parts epoxidized linseed oil, 8 parts xylol, 2 parts monomethyl ether of ethylene glycol and 1.5 parts of a 40% solution of benzyl trimethyl ammonium hydroxide in methanol. This system yielded films when baked at 250° F. which were superior to those obtained in Examples VI and VII above.

*Example IX*

A copolymer was prepared as in Example I using 565 parts xylol, 145 parts monoethyl ether of ethylene glycol, 441 parts styrene, 133 parts ethyl acrylate, 129 parts methacrylic acid, 16 parts cumene hydroperoxide and 5 parts ditertiary butyl peroxide. 100 parts of this copolymer solution blended with 20 parts epoxidized linseed oil, 16 parts xylol, 4 parts monomethyl ether of ethylene glycol and 2 parts of a 40% solution in methanol of benzyl trimethyl ammonium hydroxide yielded films when baked at 250° F. to 300° F. which were tough, hard, flexible, and resistant to solvents, soaps and alkalis.

*Example X*

100 parts of the copolymer solution of Example IX was blended with 20 parts epoxidized linseed oil, 16 parts xylol, 4 parts monomethyl ether of ethylene glycol and 0.7 part potassium hydroxide. Films baked at 250° F. to 300° F. had properties similar to those of Example IX, while films baked without catalyst required a bake at 325° F. to 350° F. to obtain similar properties.

*Example XI*

Harder films after baking at 250° F. and with more resistance than those in Examples IX and X were obtained by using only 10 parts epoxidized linseed oil per 100 parts of copolymer solution in conjunction with either potassium hydroxide or benzyl trimethyl ammonium hydroxide as catalyst.

*Example XII*

Using the copolymer solution-epoxidized oil blend of Example XI sodium acetate was added as a curing catalyst at a level of 1% based on solids. Films baked at 250–275° were comparable in properties to those films of Example XI baked at the same temperature and also were comparable to uncatalyzed films baker at 325°–350° F.

*Example XIII*

A copolymer solution was prepared as in Example I using 544 parts xylol, 136 parts butyl alcohol, 440 parts styrene, 133 parts ethyl acrylate, 97 parts methacrylic acid and 20 parts cumene hydroperoxide. 100 parts of this copolymer solution was then blended with 10 parts epoxidized ester of pentaerythritol and linseed fatty acids, 8 parts xylol and 2 parts monomethyl ether of ethylene glycol. To part of this blend was added potassium hydroxide at a level of 1% of the solids, to a second portion of the blend was added sodium acetate at a level of 1% of the solids, and a third portion was left uncatalyzed. Films of the first two portions were baked at 250–275° F. and found to be superior to films of the uncatalyzed portion baked at the same temperature. Such and like oils also being epoxidized fatty esters.

*Example XIV*

A copolymer solution was prepared as in Example I using 570 parts xylene, 150 parts of the monomethyl ether of ethylene glycol, 224 parts styrene, 355 parts ethyl acrylate, 129 parts methacrylic acid, 16 parts cumene hydroperoxide and 5 parts ditertiary butyl peroxide. 100 parts of this copolymer solution blended with 10 parts epoxidized linseed oil, 8 parts xylol, 2 parts monomethyl ether of ethylene glycol and 0.6 parts potassium hydroxide yielded films when baked at 250–300° F. which were very tough, hard and chemical resistant.

The solvent systems for the copolymers are comprised of (1) an active or true solvent for the copolymer and (2) a diluent or thinner for the true solution. Active solvents which are preferred are lower alkyl alcohols such as isopropyl alcohol, n-butyl alcohol and iso amyl alcohol, and lower alkyl glycol ethers such as the monomethyl ether of ethylene glycol and the monomethyl ether of propylene glycol. Other active solvents which are less preferred include lower alkyl ketones such as acetone, methyl ethyl ketone, and methyl isobutyl ketone and lower alkyl acetates such as ethyl acetate and butyl acetate.

The preferred diluent solvent is a conventional aromatic paint and enamel solvent as xylene, but other lower alkyl benzenes such as toluene, cumene, psuedo cumene and even benzene can be used. However, xylene is preferred because it is low in cost and is easily handled by paint manufacturers. Aliphatic diluents such as mineral spirits, VM & P and white spirits cannot be used satisfactorily as diluents because these cause precipitation of the copolymer resin.

The copolymers are comprised of the following monomers: (1) an aromatic vinyl monomer or mixture thereof; (2) a lower alkyl ester of an acrylic acid or mixtures thereof and (3) an acrylic acid or mixtures thereof. Examples of preferred aromatic vinyl monomers are styrene, vinyl toluene, 2-methyl styrene, divinyl benzene, and ethyl styrene. Examples of useful lower alkyl esters of an acrylic acid include methyl methacrylate, butyl methacrylate, 2-ethyl hexyl methacrylate, 2-ethyl hexyl methacrylate, methyl acrylate, methyl acrylate, ethyl acrylate, butyl acrylate, 2-ethyl hexyl acrylate, methyl crotonate and iso propyl acrylate. Examples of acrylic acids which are preferred are acrylic acid, methacrylic acid and crotonic acid.

Any of the known free radical peroxide or hydroperoxide catalysts may be used to catalyze the copolymerization reactions. In this invention cumene hydroperoxide or a mixture of cumene hydroperoxide and ditertiary butyl peroxide is the preferred catalyst.

Several catalysts have been found which effectively catalyze the reaction between the carboxyl groups of the copolymer and the epoxy groups of the epoxidized oil and esters in films. These catalysts are in addition to those disclosed in U.S. Patents 2,604,464, 2,662,870 and 2,798,861 and are alkali metal hydroxides and alkali metal salts of weak organic acids such as potassium hydroxide, sodium hydroxide and lithium acetate and potassium acetate, and quaternary ammonium hydroxides.

The epoxidized oils and esters used with the copolymers to form hard, tough flexible, adherent and resistant films upon baking are considerably different in chemical structure than the "Epon" and glycidyl compounds having terminal oxirane, such as, diphenylol propane diglycidyl ether of U.S. Patent 2,604,464 and the low molecular weight condensation product of diphenylol propane and epichlorohydrin described in U.S. Patents 2,662,870 and 2,798,861.

The epoxidized oils or glycerides and esters used in this invention are generally known as epoxidized esters of long chain fatty acids containing internal oxirane groups and of the character represented as follows:

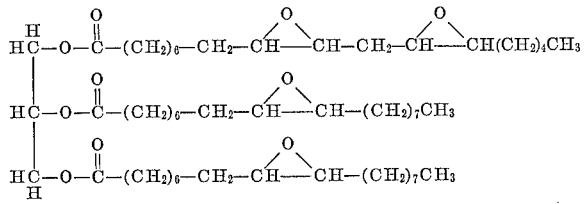

which is a typical structure for epoxidized soybean oil.

Various of the epoxidized oils or fatty esters which can be used include epoxidized soybean oil, epoxidized safflower oil, epoxidized linseed oil, butyl epoxy tallate, and the epoxidized ester of linseed oil fatty acids and pentaerythritol. Many similar epoxidized oils or long chain fatty esters and epoxidized fatty alcohols are applicable but these examples are representative of a class of useful materials, including other like natural and synthetic aliphatic chains of animal, vegetable and marine oils, including mono and poly hydroxy alcohol esters of the fatty chains, and fatty alcohols prepared therefrom, and it is not intended to limit this invention to the specific epoxidized fatty oils and esters listed above. It will be recognized, for example, that the epoxidized fatty alcohols, of the character derived from fatty oils and the like, although appearing to be operable, are not economically feasible at the present time. In addition, the copolymer systems described in the foregoing examples can be pigmented with any of the well known inert conventional white and colored pigments utilized in paints and enamels. Such pigments are, for example, titanium dioxide, iron oxides, carbon black, molybdates, phthalocyanines, and the like.

Illustrative of such pigmented coatings are the following:

Example XIX

A white enamel was made using the blend of Example II by mixing 200 parts rutile titanium dioxide with 534 parts of resin blend of Example II, 131 parts xylol and 33 parts butanol. This mixture was ground in a conventional ball mill paint dispersing apparatus for 24 hours. Hard, tough adherent and chemical resistant enamel films with very high gloss were obtained after baking the films 30 minutes at 300–350° F.

Example XX

In a similar manner an orange enamel was made by dispersing 150 parts molybdate orange pigment in 856 parts of the resin of Example II, 222 parts xylol and 55 parts butanol. Enamel films made from this composition were hard, tough, adherent and very glossy after being cured 30 minutes at 300–350° F.

From the above description it will be apparent that some modifications and variations of this invention as hereintofore set forth may be made without departing from the spirit and scope thereof. The specific embodiments described are given by way of example only and invention or improvement is limited only by the terms of the appended claims.

I claim:

1. A thermosetting coating composition consisting essentially of:
    (a) copolymer of from 15–80 parts of aromatic vinyl monomer selected from the group consisting of styrene, vinyl toluene, methyl styrene, divinyl benzene, and ethyl styrene; from 15–80 parts of ester selected from the group consisting of lower alkyl esters of acrylic acid, methacrylic acid, crotonic acid, and mixtures of said esters; and from 5–25 parts of acid selected from the group consisting of acrylic acid, methacrylic acid, crotonic acid, and mixtures thereof; the total of said parts being 100; and
    (b) epoxidized long chain fatty ester having an internal oxirane value of at least about 6%; from 10 to 60 parts of epoxidized fatty ester being present per 100 parts of copolymer.

2. The coating composition of claim 1 wherein said epoxidized fatty ester is epoxidized fatty glyceride.

3. The coating composition of claim 2 wherein solvent is included in an amount about equal to the combined weight of said copolymer and said epoxidized fatty glyceride and wherein from about 0.25% to 2% catalyst is included, said catalyst being selected from the group consisting of quaternary ammonium hydroxides, alkali metal hydroxides, and alkali metal salts of weak organic acids, the amount of said catalyst being based on the combined weight of said copolymer and said epoxidized fatty glyceride.

(References on following page)

References Cited by the Examiner

UNITED STATES PATENTS

| | | | |
|---|---|---|---|
| 2,596,737 | 5/1952 | Tess et al. | 260—18 |
| 2,604,464 | 7/1952 | Segall et al. | 260—47 |
| 2,798,861 | 7/1957 | Segall et al. | 260—23 |
| 2,909,537 | 10/1959 | Chatfield | 260—23 |
| 2,934,516 | 4/1960 | Hicks | 260—23 |
| 2,949,438 | 8/1960 | Hicks | 260—23 |
| 3,008,914 | 11/1961 | Fry | 260—23 EP |
| 3,030,332 | 4/1962 | Lombardi et al. | 260—23 |
| 3,031,434 | 4/1962 | Radlove | 260—18 |

LEON J. BERCOVITZ, *Primary Examiner.*

MILTON STERMAN, *Examiner.*

T. D. KERWIN, R. A. WHITE, *Assistant Examiners.*